United States Patent [19]

Numakura

[11] 4,186,411
[45] Jan. 29, 1980

[54] RECORDING AND PLAYBACK MODULATION METHOD AND APPARATUS

[75] Inventor: Toshihiko Numakura, Kamakura, Japan

[73] Assignee: Sony Corporation, Tokyo, Japan

[21] Appl. No.: 812,356

[22] Filed: Jul. 1, 1977

[30] Foreign Application Priority Data

Jul. 6, 1976 [JP] Japan .................................. 51/80126

[51] Int. Cl.$^2$ .......................... H04N 5/76; G11B 5/02; G11B 5/04; H04N 5/78
[52] U.S. Cl. ........................................ 358/8; 360/18; 360/30; 360/33
[58] Field of Search ........................ 360/18, 19, 30, 33, 360/34, 40, 48, 32, 21, 24–27; 358/4, 8, 127–130, 132, 17, 158, 31, 195; 325/143; 179/15 AW

[56] References Cited

U.S. PATENT DOCUMENTS

| | | | |
|---|---|---|---|
| 2,492,346 | 12/1949 | Arditi et al. ................ | 179/15 AW X |
| 3,042,754 | 7/1962 | McManis ....................... | 179/15 AW |
| 3,174,141 | 3/1965 | Sullivan et al. ..................... | 360/48 X |
| 3,435,135 | 3/1969 | Yasuoka et al. ........................ | 360/19 |
| 3,446,914 | 5/1969 | Hodge ..................................... | 360/19 |
| 3,482,038 | 12/1969 | Warren ................................ | 360/30 X |
| 3,622,693 | 11/1971 | Del Clello et al. ................... | 358/4 X |
| 3,688,025 | 8/1972 | Whittemore, Jr. ................... | 358/132 |
| 3,701,846 | 10/1972 | Zenzefilis ............................... | 360/33 |
| 3,730,983 | 5/1973 | Numakura et al. ....................... | 358/4 |
| 3,749,833 | 7/1973 | Rait et al. ........................... | 360/32 X |
| 3,812,523 | 5/1974 | Narahara ........................... | 360/33 X |
| 3,814,843 | 6/1974 | Kruszewski ........................... | 358/195 |
| 3,836,707 | 9/1974 | Murakami et al. ..................... | 358/31 |
| 3,918,085 | 11/1975 | Numakura et al. ................... | 358/8 X |
| 3,969,757 | 7/1976 | Amery ................................ | 358/8 X |
| 4,012,771 | 3/1977 | Ishigaki et al. ........................... | 358/4 |
| 4,012,774 | 3/1977 | Kuniyoshi et al. ...................... | 358/8 |

OTHER PUBLICATIONS

Communication Systems; Carlson; McGraw-Hill ® 1968, pp. 296–299.
Pulse, Digital and Switching Waveforms; Milliman & Taub; McGraw Hill ® 1965, pp. 38–41.
Philips on Printing Motion; Reprinted from Eduology, vol. 4, Issue 1, 1973, pp. 1–7.

Primary Examiner—Robert L. Griffin
Assistant Examiner—Aristotelis M. Psitos
Attorney, Agent, or Firm—Lewis H. Eslinger; Alvin Sinderbrand

[57] ABSTRACT

Overlapping, minute regions of magnetization in a recording medium, which are produced during recording and cause distortion of the played back signal, are reduced by encoding the signal in a pulse signal. The time between pulses is varied according to the amplitude of the signal to be recorded, and when this pulse signal is recorded, the minute regions are reduced to elemental size. Thus they overlap less and do not distort the reproduced signal by offsetting the zero level.

25 Claims, 24 Drawing Figures

RECORDING AND PLAYBACK MODULATION METHOD AND APPARATUS

BACKGROUND OF THE INVENTION

1. Field of the Invention

This invention relates to the field of recording and reproducing signals, and particularly to the reduction of distortion of reproduced signals due to zero level offset caused by the overlap of minute areas of recording medium affected by successive signal increments.

2. The Prior Art

It has been the practice in video tape recorders to modulate the frequency of a carrier with the luminance signal and record the resulting frequency-modulated signal without further change, except for limiting and filtering it. The frequency modulated luminance signal causes the recording transducer to produce a magnetic field of extremely limited extent. This field enters the layer of magnetic particles on the tape and realigns the magnetic domains of those particles within a certain distance of the air gap of the transducer, the distance being determined by many factors, including the frequency of the signals applied to the transducer. Lower frequency signals affect the magnetic particles more distant from the air gap and thus farther into the magnetic layer than higher frequency signals.

As the tape (it should be realized that other forms of magnetic recording medium are the equivalent of tape, insofar as this discussion is concerned) moves relative to the transducer, the magnetic fields are spread along the recording path. Since the frequency modulated signal is amplitude-limited, the reversals of polarity of both the signal and the resulting recorded incremental fields are relatively sharp. As a result, the magnetization due to one polarity of field overlaps, to some extent, the magnetization due to the opposite polarity immediately preceding. However, when the applied frequency goes from a relatively lower value to a higher value, the penetration of magnetization into the layer of magnetic particles decreases, so that the effective overlap decreases.

When a tape recorded in the manner just described is played back, flux from the minute magnetic fields of the recorded signal produces a voltage across the coil of the transducer. This may be the same transducer as was used for recording, and hence, in the following specification and claims, the term "recording transducer" is intended to distinquish the transducer from transducers that change one form of energy into another but are not capable of either recording or playing back. Specifically, it is to be understood that a "recording transducer" may also be used as a playback transducer. The voltage induced during playback is a function of the total flux linked at any instant by the transducer and is therefore affected by the amount of overlap on adjacent, incremental magnetic fields. If the amount of overlap shifts suddenly, the effect may be to displace the zero level of the reproduced frequency modulated signal. When this reproduced signal is limited, or clipped, before being demodulated, this displacement of zero level can result in a false output signal.

OBJECTS AND SUMMARY OF THE INVENTION

It is one of the objects of this invention to provide a new way of treating an information signal prior to recording it to reduce adverse field effects in the recording medium.

Another object is to provide improved apparatus for transforming a limited, or clipped frequency modulated signal into a signal of short pulses to be recorded.

A further object is to provide an improved method of generating a pulse signal that has an information signal encoded in the time between successive pulses.

Still further objects will become apparent after studying the following specification and claims with the drawings.

In accordance with the invention a signal to be recorded is used to control the generation of a pulse signal comprising a series of short pulses so that such pulses will be spaced apart in time according to the amplitude of the signal to be recorded. When such a signal is recorded, it does not create the usual extended, or smeared, recorded field but produces a series of relatively isolated field regions that cause a minimum of deleterious interaction.

DETAILED DESCRIPTION OF THE INVENTION

Figure 1A:
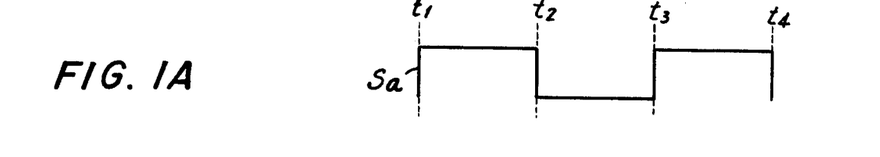
FIG. 1A is a graph showing the waveform of a square wave signal.

FIG. 1A represents a simple square wave $S_a$ that alternates between a positive polarity and a fixed amplitude (between times $t_1$ to $t_2$ and $t_3$ to $t_4$) and a negative polarity and the same fixed amplitude (between times $t_2$ to $t_3$).

Figure 1B:
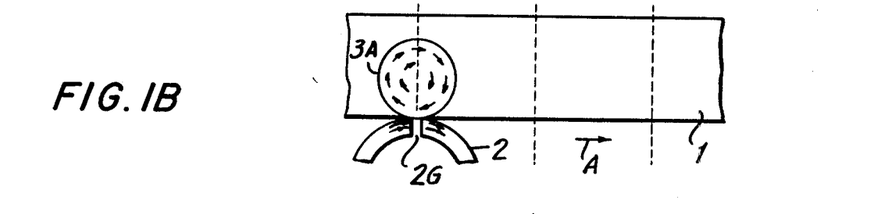
FIGS. 1B–1F are symbolic and idealized representations of a cross section of a layer of recording medium, a transducer recording in the layer the signal in FIG. 1A, and the resulting recorded fields.

FIG. 1B shows recording medium 1, which may be thought of as representing a layer of magnetic particles on a layer of tape or another recording medium. To simplify the following description, the medium 1 will simply be called tape 1. Part of a recording transducer 2 is shown at an initial point to begin recording the signal in FIG. 1A on the tape 1. The initial magnetic field produced by flux at the airgap 2G of the transducer is represented as a circle 3A. The field is actually cylindrical and should be thought of as extending some distance behind the plane of the paper. Of course, the components are shown in FIG. 2B enormously enlarged, the tape 1 even more than the transducer 2, for illustrative purposes.

Figure 1C:
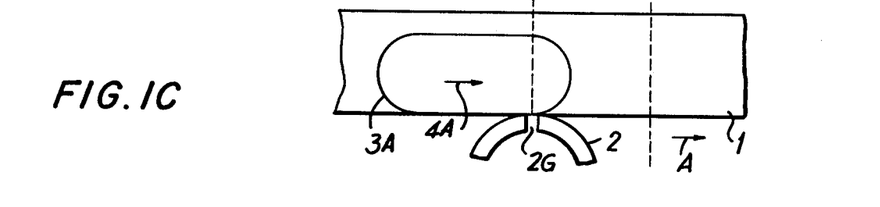

The transducer 2 is indicated by an arrow A to be moving to the right relative to the tape 1. It does not matter whether the transducer 2 or the tape 1 moves; all that is important is that there be relative movement between them. The movement should also be at a constant speed. The result of this movement is to extend the area (actually, the volume) of magnetization 3A, as shown in FIG. 1C. Thus the magnetized region may be thought of as somewhat smeared, but not in a deleterious sense.

While the remanent magnetizations of all of the infinitesimal magnetic domains within the elongated region 3A in FIG. 1C have a variety of directions corresponding more or less to the racetrack-shaped perimeter shown, it is sufficient to consider that the average magnetic field of the region 3A is represented by an arrow 4A.

Figure 1D:
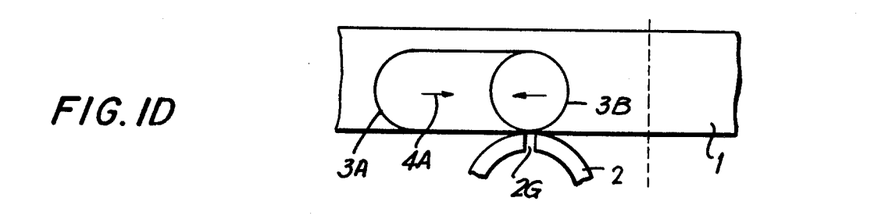

Between the times $t_1$ and $t_2$ the transducer 2 is shown as having moved a certain distance. At the time $t_2$ the signal $S_a$ suddenly reverses polarity. As shown in FIG. 1D, this causes a virtually instantaneous reversal of the direction flux in the transducer 2, so that the magnetic field begins to record a magnetization region 3B that has a general magnetic polarity direction indicated by the arrow 4B. In fact, the reversal of polarity cannot be truly instantaneous, but to simplify the explanation, it will be so considered.

Figure 1E:
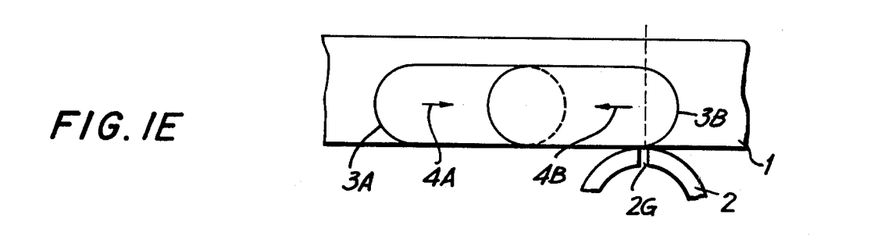

As the uniform movement of the transducer 2 continues from the time $t_2$ to the time $t_3$, the entire elongated region 3B of magnetization will be formed and will overlap the preceding region 3A, as indicated by the dotted semicircle in FIG. 1E.

Figure 1F:
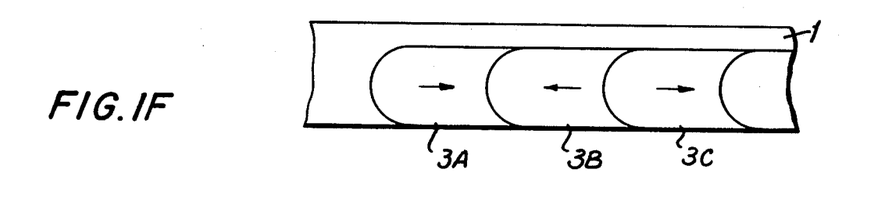

FIG. 1F shows a series of magnetization regions 3A–3C of alternating polarity. These regions are of equal width corresponding to the repetition rate, or frequency of the square wave signal $S_a$ in FIG. 1A and to the fixed relative speed of movement between the tape 1 and the transducer 2.

Figure 2A:
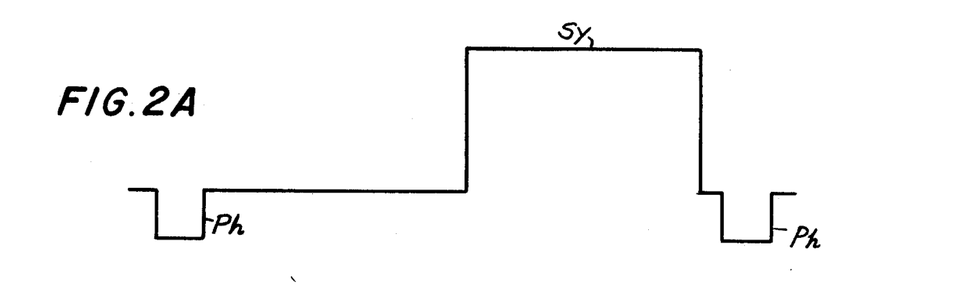
FIG. 2A is a graph of a video signal.

FIG. 2A shows a simple video signal $S_y$ having sync pulses $P_h$. Only a single horizontal interval is illustrated, and if each horizontal interval had the same waveform, a picture similar to that in FIG. 3 would be created; entirely black on the left half and entirely white on the right. It is common in recording such signals to modulate the frequency of an oscillator so that the negative parts of the information signal causes the oscillator frequency to go down and positive parts cause the frequency to go up. In the case of the video information signal $S_y$, the positive parts are the white level and the most negative parts are the tips of the sync pulses $P_h$.

Figure 2B:
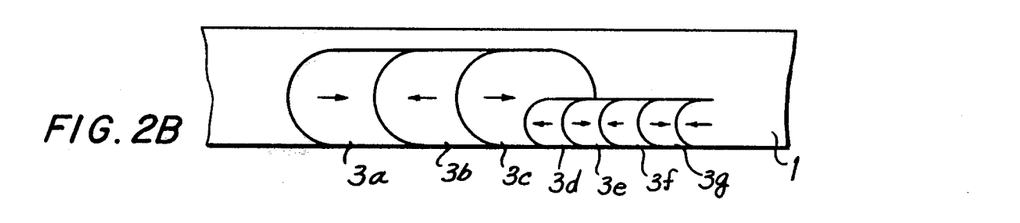
FIG. 2B is a symbolic and idealized representation of a cross section of a layer of recording medium showing the recorded fields.

FIG. 2B shows a small section of the the tape 1 with magnetization regions 3a–3g produced by recording a carrier frequency modulated by the signal $S_y$ in FIG. 2A. During the black part of the signal, the frequency is relatively low, causing relatively wide and deep magnetization regions 3a–3c to be formed.

Figure 2C:
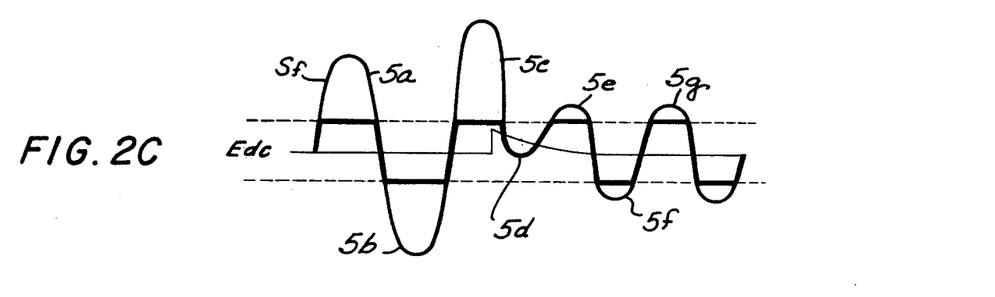
FIG. 2C shows the waveform of a signal reproduced from the recorded information in FIG. 2B.

The problem with which this invention is concerned begins to be apparent when the signal recorded as in FIG. 2B is reproduced or played back to provide the reproduced signal shown on FIG. 2C. The first positive loop of the reproduced signal is produced by the relatively large amount of flux from the magnetization region 3a. The duration of this loop, which corresponds to its frequency, is determined by the horizontal dimension of the region 3a. The negative loop 5b of approximately the same size as loop 5a is determined by the reverse magnetic polarity in the region 3b.

The loop 5c is generated as a result of magnetization in the region 3c. Since this region is less overlapped, and therefore less cancelled, by the following region 3d, the loop 5c has a greater amplitude than the loops 5a and 5b. More importantly, the magnetization in the region affects the voltage represented by the loop 5d, which is supposed to be generated by flux from the region 3d, alone. Because of the interaction of flux from the region 3c, the loop 5d may not even reach the zero signal level $E_{dc}$. This is equivalent to saying that the d.c. zero level is displaced suddenly upwardly, as shown. The zero level gradually subsides to the proper value as the successive small loops 5e–5g are generated.

Figure 2D:
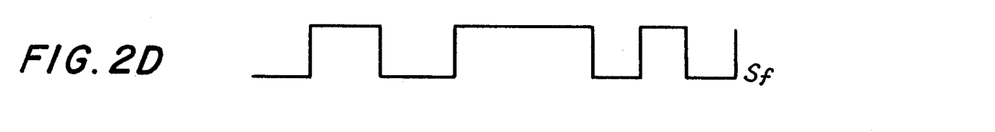
FIG. 2D is an idealized waveform showing the result of amplitude-limiting the signal depicted in FIG. 2C.

As is commonly done, the signal $S_f$ is limited, although the limiting action is so sharp that it may be described as clipping along the horizontal dotted lines. The remaining portion of the signal $S_f$ after such clipping, is shown by a heavier line. This waveform is essentially trapezoidal but may be referred to as substantially rectangular. It may actually be made more perfectly rectangular by placing the clipping levels closer to the $E_{dc}$ level. If this is done, and if the upper clipping level happens to fall below the loop 5d, the idealized rectangular wave $S_f$ in FIG. 2D will result. The loop 5d is no longer present, and the width of the rectangular signal that includes the remainder of the clipped loops 5c–5e is the same as if the frequency of the reproduced signal $S_f$ had suddenly dropped to a very low value. In the case of frequency modulation, this is the same as if the carrier had been over-modulated by the video information signal.

Figure 3:
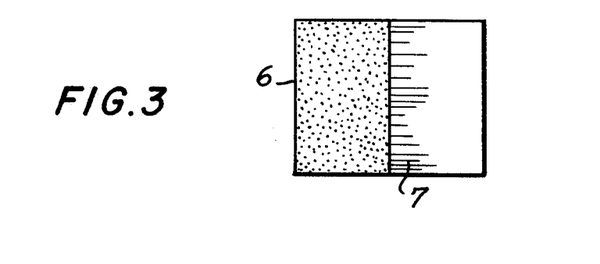
FIG. 3 illustrates a video image based on the signal in FIG. 2A and the distortion shown in the waveform in FIG. 2C.

The adverse effect of this on the picture 6 is shown in FIG. 3 in which horizontal black lines extend from the right hand edge of the black region into the white region. These lines are referred to as thin or slender black noise 7, and the reason that they do not appear in every scanned line may be because the loop 5d sometimes extends far enough down so that it will not be clipped out of existence but other times does not extend that far down. Of course, the picture 6 is specially devised to illustrate the problem in its worst light, but the effect is always present to some degree.

Moreover, in existing color video tape recorders in which the luminance signal $S_y$ is converted into a frequency modulated signal and the chrominance signal is modulated on a subcarrier and is converted to a relatively low frequency band substantially below any frequency of the band of frequency modulated signals and then added to the frequency modulated signal, the positive and negative half cycles of the frequency modulated signal should be symmetrical. If they are not, the strength of magnetization varies at every half cycle, which causes a beat signal to be generated between the frequency modulated signal and the chrominance signal. This beat signal creates a pattern visible in the reproduced picture.

Figure 4:
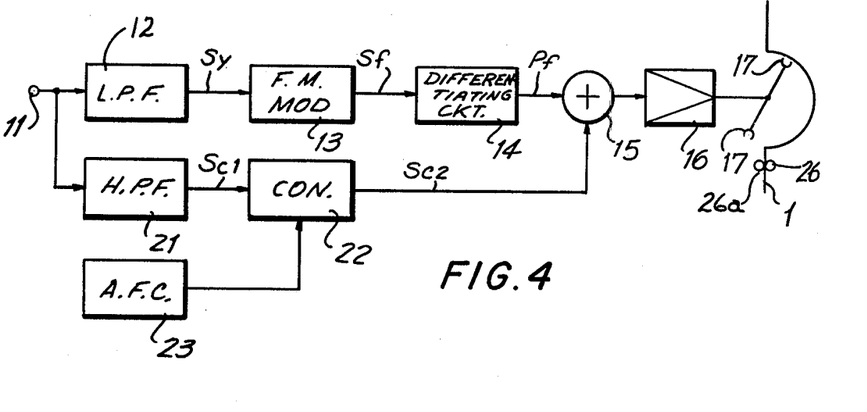
FIG. 4 is a schematic circuit diagram of a recording circuit according to one embodiment of the present invention.
Figure 5A:
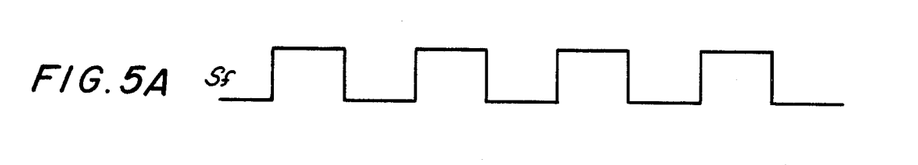
FIGS. 5A and 5B illustrate waveforms encountered in the operation of the circuit in FIG. 4.

FIG. 4 is a circuit diagram of one embodiment of recording circuit to avoid the problem arising from undesired effects of unequal adjacent magnetization fields. The circuit includes an input terminal 11 connected to a low pass filter 12 to separate the luminance component signal $S_y$ from a complete color video signal. The filter is connected to a circuit 13 in which a frequency modulated signal, such as the signal $S_f$ in FIG. 5A, is produced. This signal is shown as having a substantially rectangular waveform frequency modulated by the luminance signal from the filter 12. The circuit 13 may include a carrier generator, modulation means to produce angular modulation of the carrier, and a limiter. The substantially rectangular waveform may be an idealized representation of a trapezoidal wave, that is, a wave in which the rising and falling edges sloped slightly. Of course, no real wave can have leading and lagging edges that rise and fall in zero time, and the term "substantially rectangular" as applied to the waveform in FIG. 5A should be understood as including slightly trapezoidal waves.

Figure 5B:
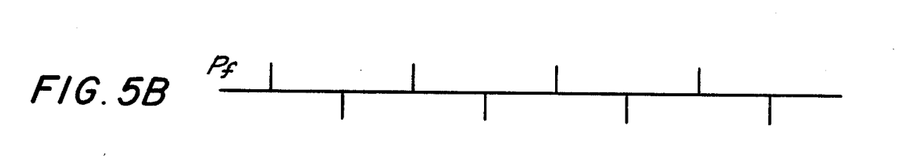

The substantially rectangular signal $S_f$ from the circuit 13 is applied to a differentiating circuit 14, which produces the pulse signal $P_f$ shown in FIG. 5B. This is also an idealized waveform in that the differentiated pulses appear to have no width. However, a good approximation of such a pulse signal can be produced in which each pulse has a very low duty cycle or ratio. Since the signal $P_f$ is obtained by differentiating the signal $S_f$, the pulses in the signal $P_f$ are alternately positive-going and negative-going, corresponding to the rising and falling edges in the signal $S_f$. The circuits 13 and 14 may be considered as pulse producing means for producing the signal $P_f$ in which the pulses are spaced apart in time according to the amplitude of the input signal $S_y$, which is thus encoded in the pulse signal $P_f$.

In the case of a video input signal, the resulting pulse signal is connected to an amplifier 16 the output of which is connected to a recording transducer. This transducer may be of the usual type for recording video signals on magnetic tape 1. The transducer has two transducer heads 17 balanced at opposite ends of an arm that rotates and scans helical paths on the tape 1. The latter is pulled along smoothly by transport means, here illustrated as a capstan 26 and pressure wheel 26a. Such motion of the tape 1, combined with uniform rotation of the transducer means 17, produces the desired smooth relative movement between the transducer and the tape. The helical paths have the form of slant tracks if the tape 1 is laid out flat, as is well known.

The circuit in FIG. 4 is actually arranged to handle a color video signal. An adder circuit 15 is included in the circuit between the differentiator 14 and the amplifier 16 to add the chrominance signal to the pulse signal $P_f$. The chrominance signal is separated from the incoming signal by the input filter means that includes the low pass filter 12 for transmitting luminance components and a high pass or band pass filter 21 for the chrominance component signal. The filter 21 is connected to frequency conversion means comprising a frequency converter 22 and a circuit 23 to generate a frequency conversion carrier. The circuit 23 preferably includes automatic frequency-control means to maintain the carrier at a precise frequency that will convert the subcarrier of the incoming chrominance signal $S_{c1}$ from 3.58 MHZ to about 767 KHZ, the frequency of the converted signal $S_{c2}$, which is substantially below any frequency in the band of output signals from the frequency modulation circuit 13.

Figure 6A:
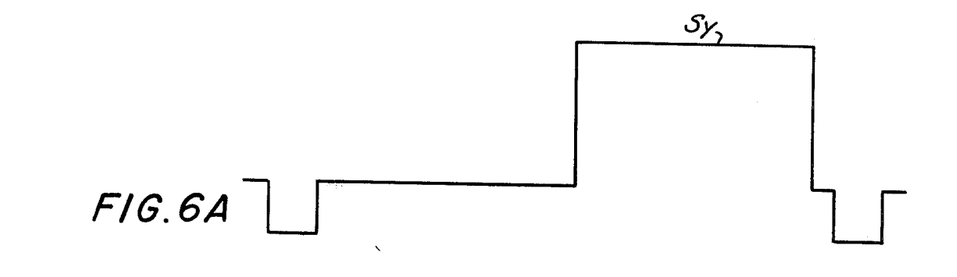
FIG. 6 is a graph of the waveform of the same video signal depicted in FIG. 2A.

FIG. 6A repeats the video signal $S_y$ also shown in FIG. 2A. It is repeated here only to establish relative timing relationships for the tape 1 in FIG. 6B.

Figure 6B:
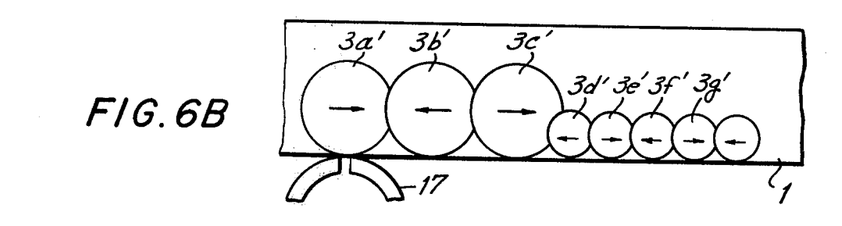
FIG. 6B represents in symbolic and idealized form recorded field in a recording medium when the signal in FIG. 6A is applied to the circuit in FIG. 4.
Figure 6C:
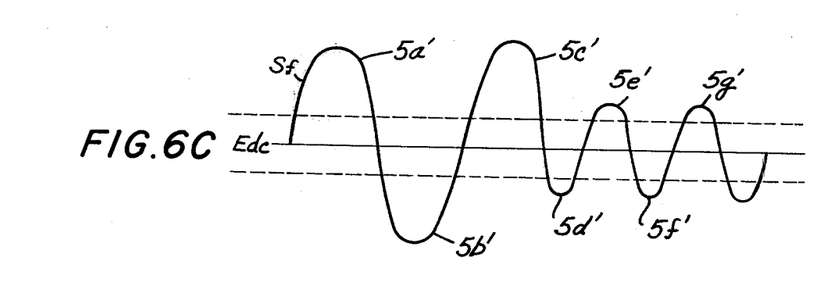
FIG. 6C represents the waveform of a reproduced signal derived from the recorded field pattern in FIG. 6B.
Figure 6D:
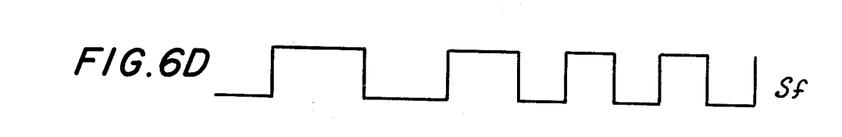
FIG. 6D represents in symbolic and idealized form the result of amplitude-limiting the signal represented in FIG. 6C.

FIG. 6B illustrates the result of transforming the frequency modulated output signal $S_f$ from the circuit 13 in FIG. 4 into a signal $P_f$ of short duration pulses. Each of these short pulses, when applied to the recording transducer 17, causes the transducer to impart enough energy to the magnetic material of the tape 1 to produce the beginning of a magnetization region, but each pulse is of such short duration that there is not time for much relative movement between the tape and the transducer 17 before the pulse is finished. Thus, there is little or no elongation of each of the regions $3a'-3g'$ and, therefore, little overlap at the same relative speed between the transducer 17 and the tape 1 in comparison with the much larger overlap in the arrangement shown in FIGS. 1 and 2. As a result, the overlap between the regions $3d'$ and $3c'$ in FIG. 6B is almost the same as between the regions $3c'$ and $3b'$. The voltage excursions, or loops, $5a'-5c'$ in the signal $S_f$ in FIG. 6C are, as a consequence, almost identical, and so are the loops $5d'-5g'$. The loop $5c'$ does not rise so high that it offsets the zero level voltage $E_{de}$ and does not cause the loop $5d'$ to be lost. The clipped, substantially rectangular signal $S_f$ is simply a properly frequency modulated signal without any apparent overmodulation. The slender black noise 7 in FIG. 3 is, therefore, eliminated.

Further, no beat signal is created between the frequency modulated signal pulse signal $P_f$ and the chrominance component signal $S_c$, such as is created in prior art color video tape recorders. Each of the pulses in the pulse signal $P_f$ is so narrow that equality of amplitude between positive and negative ones of these pulses is not so important. The magnetization varies very little even if the positive pulses are not the same amplitude as the negative ones.

The small and relatively equal overlap between each magnetization region $3a'-3g'$ and its adjacent region makes it possible to record these regions closer together than can be done in recorders that spread the magnetization out in the manner shown in FIGS. 1 and 2. This means the recording information density can be increased, either by slowing down the relative movement between the tape 1 and the transducer 17 or by increasing the bandwidth of the information signal.

Figure 7:
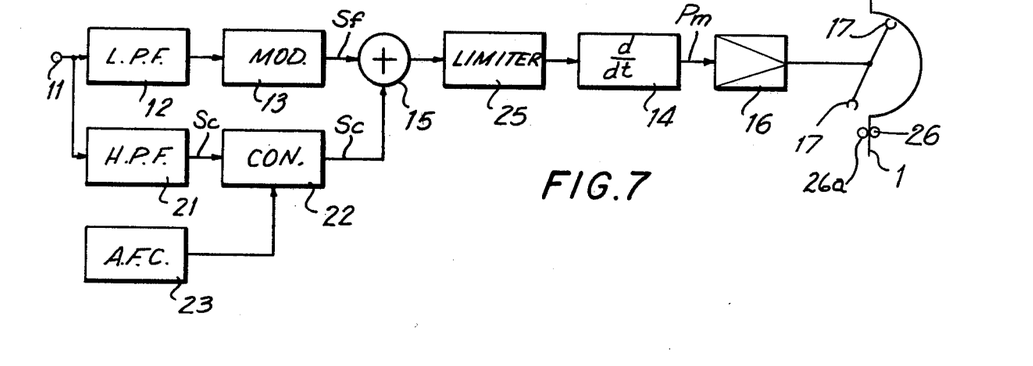
FIG. 7 is a block diagram of another embodiment of the invention.

The embodiment in FIG. 7 is similar to that in FIG. 4 except that a limiter 25 is included in the circuit between the frequency modulator 13 and the differentiator circuit 14, and the adder circuit 15 is located between the modulator 13 and the limiter 25.

Basically, the operation of the circuit in FIG. 7 is similar to that in FIG. 4. The differences are illustrated by the waveforms in FIGS. 8A–8C. The frequency modulator 13 in FIG. 7 includes means to generate a carrier wave of generally sinusoidal waveform. The frequency converted chrominance signal $S_{c2}$ from the frequency converter has a much lower frequency than even the lowest frequency in the output signal of the frequency modulator 13.

Figure 8A:
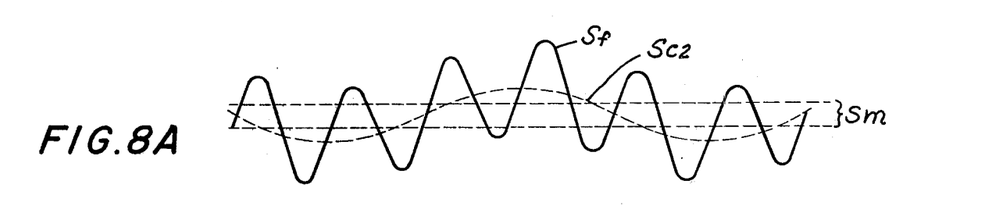
FIGS. 8A–8C are graphs showing the waveforms of signals encountered in the operation of the circuit in FIG. 7.
Figure 8B:
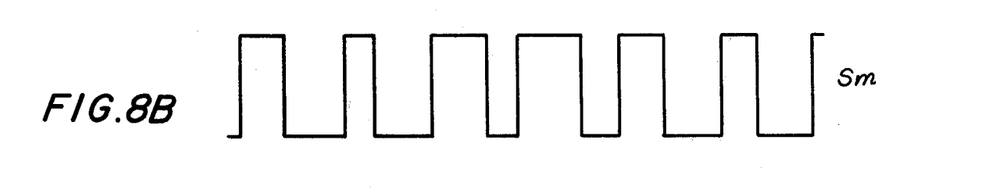

These signals are shown combined by linear addition in FIG. 8A. Although the signal $S_f$ is actually frequency modulated, so that the width of each of its cycles is different according to the amplitude of the modulating signal, the modulating signal is assumed to be so low that there is no noticeable variation in the few cycles of the signal $S_f$ shown in FIG. 8A. This simplifies the appearance of the waves and the description of the circuit. For similar reasons the frequency converted chrominance signal modulated on a carrier signal $S_{c2}$ is shown as only one and one-half cycles of a sine wave. In actual fact, depiction of enough cycles of the signal $S_{c2}$ would show it to be an amplitude modulated signal.

Figure 8C:
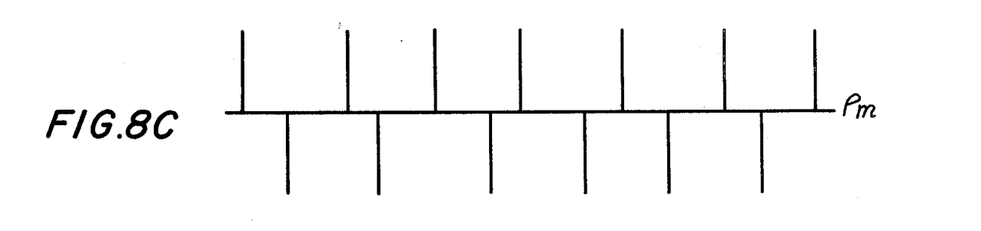

As combined in the adding circuit 15 in FIG. 7 the frequency modulated signal $S_f$ and the chrominance signal $S_{c2}$ can be limited so that only a substantially rectangular signal $S_m$, which is the portion of the solid-line waveform, emerges from the limiter 25. This wave is shown in idealized rectangular form in FIG. 8B to represent the signal $S_m$. When this signal is applied to the differentiator, the differentiated output signal $P_m$, which is also shown in idealized form, is illustrated in FIG. 8C. The apparent frequency modulation of the signal $S_m$ and the corresponding variation in time between successive pulses of the signal $P_m$ are due to the fact that the cycles of the solid line sum wave in FIG. 8A are not vertical. If the signal $S_f$ had a rectangular waveform, there would be no apparent frequency modulation of the amplitude-limited signal $S_m$ and no variation in the spacing between successive pulse in the signal $P_m$.

Figures 9, 10:
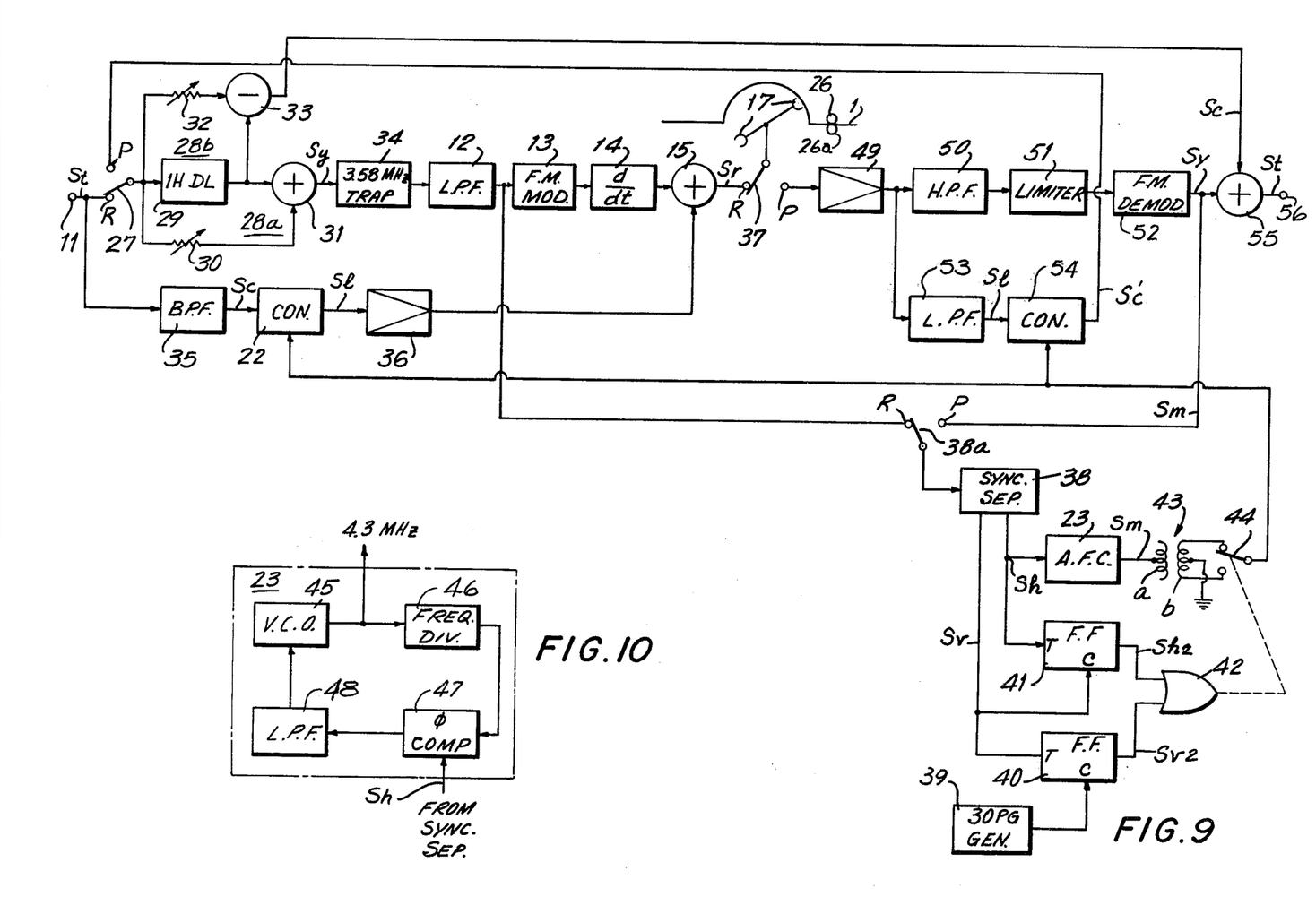
FIG. 9 is a block diagram of magnetic recording and playback apparatus according to the invention.
FIG. 10 is a block diagram of an automatic frequency controlled circuit for use in the circuit of FIG. 9.

FIG. 9 shows basic circuit components for a combined recorder and playback device. Much of the circuit of the recorder section is similar to that in FIG. 4 and need not be described again in detail. The input terminal 11 is connected to the R input terminal of a double throw switch 27, the arm of which is connected to the input terminal of a comb filter having two parts 28a and 28b. Both parts share a common 1H delay device 29 that delays input signals by a length of time equal to one line interval. The section 28a has a variable resistor 30 that connects the comb filter input terminal to one input of an adding circuit 31. The output terminal of the delay device 29 is connected to a second input terminal of the adding circuit. The output terminal of the adding circuit, from which integral multiples of the horizontal repetition frequency are available is connected through a trap circuit 34 tuned to suppress, or trap, signals having a frequency close to the frequency of the subcarrier on which the chrominance signals are modulated. The combined filtering effects of the comb filter section 28a, the trap circuit 34, and the low pass filter 12 is to prevent the chrominance component signal from reaching the frequency modulator 13.

The input terminal 11 is also connected to a bandpass filter 35 tuned to pass the chrominance component signal $S_c$ to a first frequency converter 22. The output signal $S_1$ of the frequency converter 22 is connected to an amplifier 36, which, in turn, is connected to a second input terminal of the adding circuit 15 in which the differentiated pulse signal and the frequency converted chrominance signal components are combined. The output signal $S_r$ of the adding circuit 15 is connected to the recording terminal R of a second mode switch 37, the arm of which is connected to the recording transducer means 17. The arm of the switch 37 is shown in the recording mode position.

The output terminal of the low pass filter 12 is also connected to the recording contact R of another mode switch 38a the arm of which is connected to a synchronizing, or sync, signal separating circuit 38. The latter has one output terminal from which vertical sync signals $S_v$ are obtained to be connected to the T input terminal of a T-type flip-flop 40. A pulse generator 39 of the type commonly used in video tape recorders is connected to the C input terminal of the flip-flop 40. The vertical sync signals from the circuit 38 are also connected to the C input terminal of a second T-type flip-flop circuit 41.

The sync signal separating circuit 38 has another output terminal from which horizontal sync signals $S_h$ are connected to the input terminal of the automatic frequency-control circuit 23 and to the T input terminal of the flip-flop 41. Output signals $S_{v2}$ and $S_{h2}$ from the flip-flips 40 and 41, respectively, are connected to input terminals of an OR gate 42.

The circuit 23 produces a frequency conversion carrier signal $S_m$, which is applied to the primary winding a of a transformer 43 that has a center-tapped secondary winding b. The ends of this secondary winding b are connected to two terminals of an electronic switching circuit 44, the operation of which is controlled by the output signal of the OR gate 42. The output terminal or movable contact of the switching circuit 44 is connected to the frequency converter 22 to supply the frequency conversion carrier thereto.

The operation of the switching circuit, as controlled by the OR gate 42, is such that the frequency conversion carrier signal is supplied in one phase to the frequency converter 22 when alternate tracks are being recorded on the tape. During the remaining alternate tracks the phase of the frequency conversion carrier is switched at the end of each line interval to avoid interference between signals recorded on adjacent tracks, as has been done heretofore.

The circuit 23 is shown in more detail in FIG. 10 as comprising a voltage-controlled oscillator 45 that produces the frequency conversion carrier signal. The frequency of this signal is selected to shift the frequency of the chrominance subcarrier and its sidebands to a relatively low value of about 700 KHz. The specific converted frequency is chosen so that the converted carrier and sidebands will not interfere with components of the luminance signal nor will the second harmonic of the frequency converted carrier interfere with such components. To accomplish this, the frequency converted subcarrier is preferrably selected so that its second harmonic interleaves with components of the luminance signal.

The output signal of the oscillator 45 is connected to a frequency divider 46 that divides it to the horizontal line frequency and applies the frequency-divided signal to a phase comparator 47. The phase comparator has an input terminal to which the horizontal sync signal $S_h$ from the sync separator circuit 38 is applied. The output signal of the comparator 47 is connected through a low pass filter circuit 48 to the control terminal of the voltage controlled oscillator 45 to maintain it at the proper frequency relative to the horizontal sync signals.

The playback section of the apparatus in FIG. 9 is connected to the P terminal of the mode switch 37 to obtain signals from the recording transducers 17, which operate as reproducing transducers in the playback mode. Such signals are amplified by an amplifier 49 and passed through a high pass filter 50 to a limiter 51. The amplitude-limited signal from the limiter is then frequency demodulated in a frequency demodulator 52 to reproduce the luminance signal Sy. This signal includes sync pulses and is connected via the P terminal of the mode switch 38a to the sync signal separator circuit 38.

The output signal of the amplifier 49 is also passed through a low pass filter 53 that transmits the frequency-converted chrominance component signal to a second frequency converter 54. This converter is supplied with the same frequency conversion carrier, modified by the switching circuit 44 in the same way, as the carrier supplied to the first frequency converter 22. Thus the chrominance component signal will be reconverted to its original frequency band around a subcarrier frequency of about 3.58 MHz.

The reconverted signal $S_c'$ is connected through the P terminal of the mode switch 27 to the comb filter. It can only pass through the section 28b, which comprises the delay device 29 connected to one input terminal of a subtracting circuit 33. A variable resistor 32 connects the input terminal of the comb filter to a second input terminal of the subtracting circuit 33. The two signals applied to the circuit 33 combine subtractively so that integral multiples of the horizontal line frequency are cancelled out, but signals interleaved with integral multiples of the horizontal line frequency, such as the reconverted subcarrier frequency and its sideband components, are obtained at the output of circuit 33. The comb filter section 28b also combines the reconverted chrominance signal of two successive line intervals at a time to cancel out undesired cross-talk signals picked up from adjacent tracks.

The reconverted chrominance signal, after passing through the comb filter section 28b is applied to one input terminal of an adding circuit 55, and the reproduced luminance signal Sy from the demodulator 52 is connected to a second input terminal. These signals are combined in the adding circuit 55 to recreate a complete color television signal at the output terminal 56.

What is claimed is:

1. Apparatus for recording an information signal on a recording medium, said apparatus comprising: a transducer; transport means to produce relative movement between said transducer and said recording medium; a source of a carrier signal; circuit means to angularly modulate said carrier signal by said information signal and to produce an angularly modulated signal having a substantially rectangular waveform; differentiating means for differentiating said angularly modulated rectangular waveform signal; first connecting means to apply said angularly modulated rectangular waveform signal to said differentiating means; and second connecting means to connect the output of said differentiating means to said transducer for recording of the differentiated angularly modulated rectangular waveform signal by said transducer on said recording medium.

2. The apparatus of claim 1 wherein said circuit means includes positive and negative clipping means to limit the amplitude of the angularly modulated signal to said substantially rectangular waveform.

3. The apparatus of claim 1 in which said transport means produces relative movement of substantially fixed speed between said transducer and said medium.

4. The apparatus of claim 3 in which said recording medium is a magnetic medium.

5. The apparatus of claim 1 in which said circuit means includes a frequency modulator.

6. The apparatus of claim 1 in which said information signal is a video signal comprising chrominance components modulated on a subcarrier and luminance components, and said apparatus comprises: frequency converting means to convert the frequency of said subcarrier to a frequency below said angularly modulated signal.

7. The apparatus of claim 6 in which said frequency converting means converts said subcarrier to a frequency the second harmonic of which interleaves with frequency components of said luminance signal.

8. The apparatus of claim 6 comprising: signal separating means to separate said chrominance components from said luminance components and to supply said luminance components to said circuit means.

9. The apparatus of claim 8 comprising: an adding circuit connected between said circuit means and said transducer and connected to said frequency converting means to combine the angularly modulated signal with the frequency converted signal.

10. The apparatus of claim 9 in which said first connecting means includes said adding circuit.

11. The apparatus of claim 10 in which said first connecting means further includes limiter means connected between said adding circuit and said differentiating means.

12. The apparatus of claim 9 in which said second connecting means includes said adding circuit.

13. The apparatus of claim 8 in which said signal separating means comprises a comb filter connected to receive said video signal and connected to said circuit means to supply said luminance signal thereto.

14. The apparatus of claim 6 in which said transport means causes said transducer to record said pulses in parallel tracks on said recording medium, and said frequency converting means comprises: a source of a frequency conversion carrier; a frequency converter connected to receive said chrominance components and said frequency conversion carrier; and means to modify said frequency conversion carrier selectively to reduce interference between chrominance components recorded side by side in adjacent tracks.

15. The apparatus of claim 6 in which said means to modify said frequency conversion carrier comprises means to invert the polarity of said carrier during selected line intervals in alternate ones of said parallel tracks.

16. Apparatus for recording an information signal on a recording medium, said apparatus comprising: a transducer; transport means to produce relatively constant speed movement between said transducer and said recording medium; signal producing means to produce a signal angularly modulated according to the amplitude of said information signal and having a substantially rectangular waveform; differentiating means connected to receive said angularly modulated rectangular waveform signal; and connecting means to connect the output of said differentiating means to said transducer so that the latter records the differentiated angularly modulated rectangular waveform signal on the recording medium.

17. Apparatus according to claim 16 comprising, in addition: a limiter; second connection means connecting said transducer to said limiter; and demodulator means connected to said limiter to receive an amplitude-limited output signal from said limiter and to reproduce said informaton signal from said amplitude-limited signal.

18. Apparatus according to claim 17 comprising switching means to connect said transducer alternatively to the first-named connection means to receive the differentiated angularly modulated rectangular waveform signal from said differentiating means and to said second connection means to supply thereto signals derived from said recording medium.

19. Apparatus according to claim 17 in which said demodulator means comprises angularly modulated signal demodulator means.

20. Apparatus according to claim 17 in which said demodulator means is a frequency demodulator.

21. Apparatus according to claim 17 in which said information signal is a video signal divided into intervals including line intervals and field intervals and comprising chrominance components modulated on a subcarrier and luminance components, said apparatus comprising, in addition, filter means to receive said video signal, said filter means being connected to said signal producing means to transmit substantially only said luminance components thereto to cause said signal producing means to produce said rectangular waveform signal angularly modulated according to the amplitude of said luminance components.

22. Apparatus according to claim 21 comprising: first frequency conversion means connected to said filter means to receive said chrominance components and to convert the frequency of said subcarrier to a converted frequency substantially lower than any frequency of said angularly modulated signal; second frequency conversion means connected to said second connection means to receive from said second connection means the frequency converted signals picked up from said recording medium by said transducer; said first and second frequency conversion means comprising common frequency conversion carrier generator means.

23. Apparatus according to claim 22 in which said frequency conversion carrier generator means comprises automatic frequency-controlled generator means; synchronizing signal separating means; mode switching means connecting said synchronizing signal separating means to said filter means during recording of the differentiated angularly modulated rectangular waveform signal and to said demodulator means during reproduction of said luminance components; and electronic switching means connected to said synchronizing signal separating means to be controlled by said synchronizing signals and connected to said automatic frequency-controlled generator means and said first and second frequency conversion means to control the polarity of said frequency conversion carrier applied to said first and second frequency conversion means.

24. Apparatus according to claim 23 in which said automatic frequency-controlled generator means comprises a voltage-controlled oscillator tuned to a conversion frequency; a frequency divider connected to said oscillator to divide the conversion frequency of the repetition frequency of said line intervals; means for supplying a signal at the frequency of said line intervals from said synchronizing signal separating means; and phase comparator means connected to said means for supplying and to said frequency divider to generate an oscillator control signal voltage proportional to the phase difference between said signal from said means for supplying and an output signal from said frequency divider, said phase comparator means being connected to said voltage-controlled oscillator to control the frequency thereof by said oscillator control signal voltage.

25. Apparatus according to claim 23 in which said filter means comprises comb filter means having an input terminal, a first output terminal from which signals at integral multiples of the repetition frequency of said line intervals are obtained, and a second output terminal from which signals at odd multiples of one-half said repetition frequency are obtained, said signal producing means comprises a frequency modulator and a limiter connected to said frequency modulator, and said demodulator means comprises a frequency demodulator; an input switch comprising a first terminal to which said video signal is applied during recording, a second terminal connected to the output of said second frequency conversion means, and an arm movable between said first and second terminals and connected to said input terminal, said first output terminal of said comb filter means being connected to said frequency modulator; first adder circuit means connected to said frequency modulator and to said first frequency conversion means to add the output signals therefrom; and second adder circuit means connected to said frequency demodulator and to said second output terminal of said comb filter means to combine output signals therefrom.

* * * * *